United States Patent [19]

Yerkes

[11] Patent Number: 5,240,069

[45] Date of Patent: Aug. 31, 1993

[54] INTEGRAL COOLING SYSTEM FOR A JET ENGINE INTEGRAL STARTER/GENERATOR AND THE LIKE

[75] Inventor: Kirk L. Yerkes, Miamisburg, Ohio

[73] Assignee: The United States of America as represented by the Secretary of the Air Force, Wright-Patterson Air Force Base, Ohio

[21] Appl. No.: 909,525

[22] Filed: Jul. 6, 1992

[51] Int. Cl.[5] ............................................. F28D 15/02
[52] U.S. Cl. .................................. 165/86; 165/104.25; 165/104.33; 310/54; 310/57
[58] Field of Search ................ 165/86, 104.25, 104.33; 310/54, 57

[56] References Cited

U.S. PATENT DOCUMENTS

| 3,801,843 | 4/1974 | Corman et al. ................ 165/104.25 |
| 3,902,819 | 9/1975 | Holchendler et al. . |
| 4,136,516 | 1/1979 | Corsmeier . |
| 4,546,604 | 10/1985 | Moore et al. . |
| 4,602,177 | 7/1986 | Eckels et al. . |

FOREIGN PATENT DOCUMENTS

1451523  1/1989  U.S.S.R. ......................... 165/104.26

OTHER PUBLICATIONS

SAE Technical Paper Series, Technology Review: Utilizing Rotating Thermosyphon Technology in Aircraft Thermal Management and Control Kirk L. Yerkes, 901961, pp. 1–11, The Engineering Society for Advancing Mobility Land Sea Air and Space.

*Primary Examiner*—Albert W. Davis, Jr.
*Attorney, Agent, or Firm*—Fredric L. Sinder; Thomas L. Kundert

[57] ABSTRACT

A new cooling system for a jet engine integral starter/generator incorporates an array of thermosyphons in the rotor of the starter/generator in an off-axis geometry. The condenser sections of each thermosyphon extend out from the rotor into a coolant flowpath. Fins surrounding the condenser sections are oriented to increase the flow of coolant around the starter/generator. Asymmetrical balancing wicks partially cover the inside wall of the evaporator sections of each thermosyphon. The balancing wicks have the general shape assumed by a liquid working fluid during off-axis rotation. The wick cross-sectional shape is generally that of a crescent. The balancing wicks absorb working fluid when the rotor is not rotating so that the rotor will have generally the same balance at startup as it will have during full rotational speed operation.

6 Claims, 1 Drawing Sheet

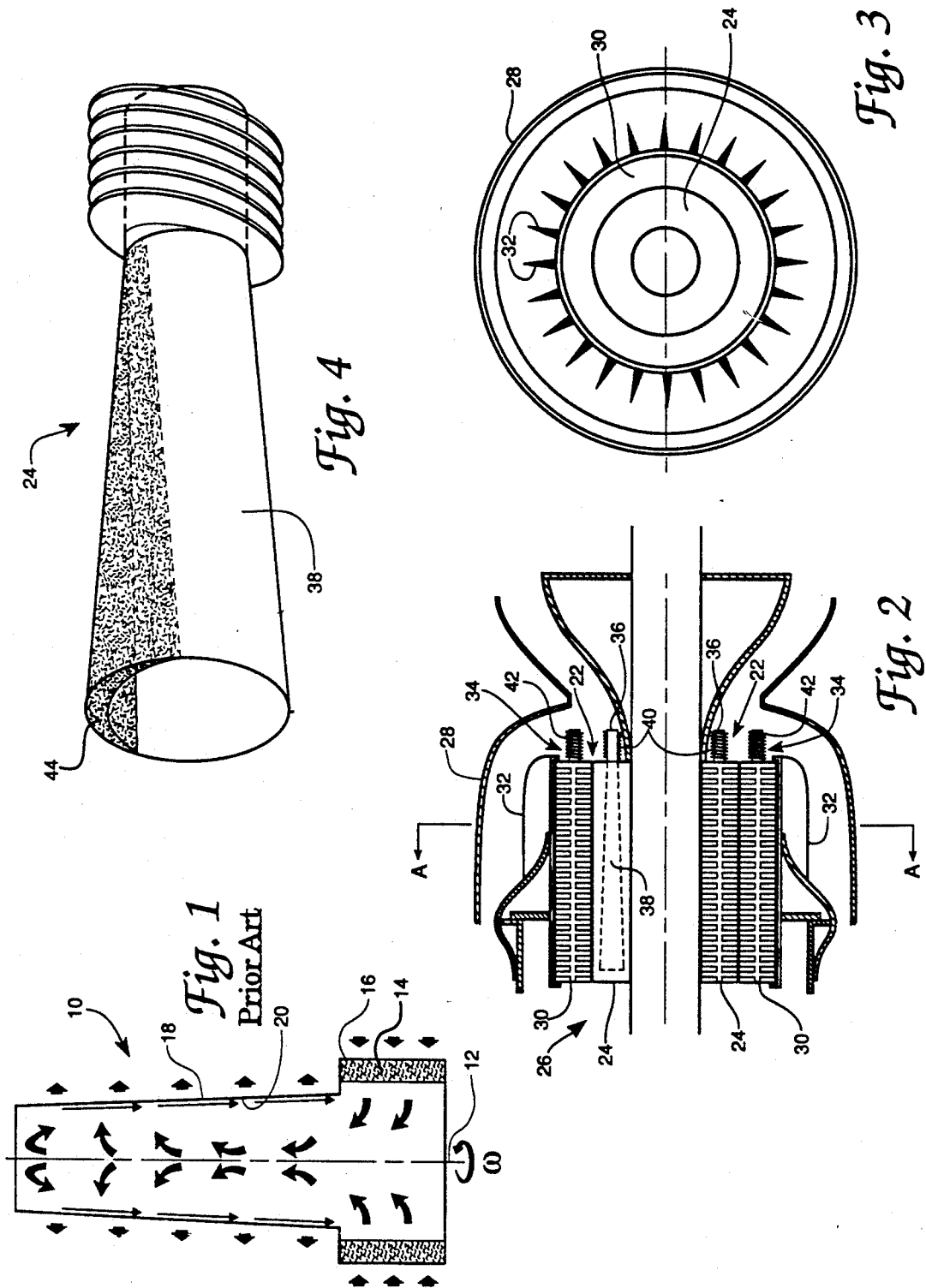

5,240,069

INTEGRAL COOLING SYSTEM FOR A JET ENGINE INTEGRAL STARTER/GENERATOR AND THE LIKE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to cooling systems for aircraft and for aircraft jet engines, and more particularly to a new integral cooling system for a jet engine integral starter/generator.

With the advent of more- and all-electric aircraft, the number and size of aircraft hydraulic systems are being reduced. One result of this process is that the aircraft starter/generator system is being incorporated inside the jet engine. Because this is a high temperature and high heat flux region, efficient dissipation of heat, or cooling, of the starter/generator is critical. Permanent magnet and switched reluctance starter/generator configurations require operating temperatures to be maintained below the Curie point of the magnets and soft magnetic materials.

The prior art has experimented with a variety of apparatus and systems for cooling turbine, or jet, engine parts. One such apparatus is a rotating two-phase thermosyphon, or wickless heat pipe. A heat pipe uses successive evaporation and condensation of a working fluid to transport thermal energy, or heat, from a heat source to a heat sink. A rotating thermosyphon uses centrifugal forces to return condensed working fluid, or condensate, from a condenser (where transported thermal energy is transferred to the heat sink by condensation) to an evaporator (where the thermal energy to be transported is absorbed from the heat sink by vaporization). Thermosyphons, like other heat pipes, can transport very large amounts of heat in the vaporized working fluid.

Unfortunately, because the cooling requirements for a jet engine integral starter/generator are so great, prior art thermosyphons and thermosyphon systems will be unable to provide the amount of cooling needed for a jet engine integral starter/generator.

Another problem with prior art thermosyphons and thermosyphon systems, particularly off-axis systems, is that they can cause imbalance problems, particularly during startup of rotation. The radius of rotation and angular velocity of integral starter/generators, combined with the movement of the aircraft itself, can cause "g" forces significantly greater than experienced by the aircraft itself, making imbalance problems even more critical.

Thus it is seen that there is a need for new rotating thermosyphons and thermosyphon systems that, while exploiting the advantages of existing thermosyphons, will provide the additional cooling needed for jet engine integral starter/generators and other like apparatus in very high temperature and heat flux environments.

It is also seen that there is a need for new rotating thermosyphons and thermosyphon systems that are inherently balanced, especially during startup.

It is, therefore, a principal object of the present invention to provide a new rotating thermosyphon and thermosyphon system particularly adapted for cooling jet engine integral starter/generators and the like.

It is another object of the present invention to provide a new rotating thermosyphon and thermosyphon system that is inherently balanced, particularly during startup.

It is a feature of the present invention that it eliminates the external coolant loops and pumps required for other cooling systems.

It is another feature of the present invention that its use of multiple thermosyphon cells will provide redundant cooling capabilities and increased reliability should one of the thermosyphon cells fail.

It is an advantage of the present invention that it is inherently reliable and will require little maintenance.

It is another advantage of the present invention that it will eliminate the startup imbalance problems of prior art off-axis thermosyphon systems.

These and other objects, features and advantages of the present invention will become apparent as the description of certain representative embodiments proceeds.

SUMMARY OF THE INVENTION

The present invention provides new thermosyphons and new thermosyphon systems particularly adapted for cooling jet engine integral starter/generators and the like. The unique discovery of the present invention is that external fins mounted to the condenser section of thermosyphon cells may be oriented not only to provide a heat rejection path, but also to increase air or other coolant flow around the starter/generator. Another unique discovery of the present invention is that an asymmetrical wick may be incorporated inside the evaporator section of a rotating thermosyphon to hold the liquid working fluid in the same crescent or similar shape that it will assume during operation so that the thermosyphon will start rotation with the same balance it will have during operational speed rotation.

Accordingly, the present invention is directed to a cooling system comprising a shroud for providing a flowpath for a coolant, a plurality of off-axis thermosyphons positioned inside the shroud, each thermosyphon having a condenser section extending into the coolant flowpath and each thermosyphon also having an evaporator section, an inside wall and a longitudinal axis, fins attached to each condenser section, wherein the fins are oriented so that they will draw coolant through the shroud, and a wick partially covering the inside wall of each enclosure, wherein a cross-section of each wick is asymmetrical about the respective longitudinal axis of each thermosyphon. Each wick may have generally the shape a liquid working fluid would assume while the plurality of thermosyphons were rotating. Each wick cross-section may have generally the shape of a crescent. Each wick may partially cover the inside wall of each evaporator section.

The present invention is also directed to a thermosyphon, comprising an enclosure, including an evaporator section and a condenser section, the enclosure having an inside wall and a longitudinal axis, and a wick partially covering the inside wall of the enclosure, wherein a cross-section of the wick is asymmetrical about the longitudinal axis. The wick may partially cover the inside wall of the evaporator section. The wick may have generally the shape a liquid working fluid would assume while the thermosyphon was rotating off-axis.

The wick cross-section may have generally the shape of a crescent.

DESCRIPTION OF THE DRAWINGS

The present invention will be more clearly understood from a reading of the following detailed description in conjunction with the accompanying drawings wherein:

FIG. 1 is a simplified cross-sectional view of a prior art rotating thermosyphon showing the flow of vapor and condensate;

FIG. 2 is a simplified cross-sectional view of a thermosyphon and thermosyphon system incorporated into a jet engine integral starter/generator according to the teachings of the present invention;

FIG. 3 is a simplified cross-sectional view of the jet engine integral starter/generator of FIG. 2 taken along line A—A; and, FIG. 4 is a simplified phantom view of one of the thermosyphons of FIG. 2 showing the addition of an internal balancing wick according to the teachings of the present invention.

DETAILED DESCRIPTION

Referring now to FIG. 1 of the drawings, there is shown a simplified cross-sectional view of a prior art rotating thermosyphon 10. Thermosyphon 10 is an on-axis thermosyphon rotating at a rate $\omega$ about a central axis 12. Liquid working fluid 14 inside an evaporator section 16 absorbs heat from a heat source (not shown) in thermal communication with evaporator section 16. The absorbed heat vaporizes some of the working fluid which then flows by the resulting vapor pressure into a condenser section 18. Condenser section 18 is in thermal communication with a heat sink, not shown, which keeps condenser section 18 cooler than evaporator section 16. Vaporized working fluid condenses on the inside wall 20 of condenser section 18, transferring the heat absorbed from the heat source at evaporator section 16 to the heat sink. The condensed working fluid is called condensate. Centrifugal forces from the rotation of thermosyphon 10 move the condensate back toward evaporator section 14 along the slope of inside wall 20. At high enough rates of rotation $\omega$, inside wall 20 does not need to be sloped as shown to return condensate to evaporator section 16.

Rotating thermosyphons can be off-axis as well as on-axis. A plurality of off-axis thermosyphons are generally arranged in a regular array parallel to and at a fixed radius from the central axis of an item of equipment to be cooled. This use of multiple thermosyphons provides greater heat flux dissipation than can be provided by a single axially mounted thermosyphon.

FIG. 2 is a simplified cross-sectional view of a plurality of thermosyphons 22 fabricated in an off-axis geometry inside the rotor 24 of a jet engine integral starter/generator 26. The uppermost thermosyphon 24 is shown in phantom view in this figure for clarity.

Starter/generator 26 is mounted inside a shroud 28 through which flows air or other gaseous or liquid coolant. A stator 30 surrounds rotor 24. A number of stator fins 32 and static heat pipes 34, mounted inside stator 30, provide additional cooling.

Each thermosyphon 24 comprises a condenser section 36 and an evaporator section 38. Fins 40 around the condenser section are canted, or otherwise oriented, so that fins 40 on all thermosyphons 24 will operate together as a blower or pump to increase coolant flow through shroud 28, thus significantly augmenting the heat flux out of rotor 24 provided by fins 40 alone. The increased coolant flow will be particularly effective in augmenting cooling around stator fins 32.

Condenser fins 42 added to the condenser sections of static heat pipes 34 similarly help increase coolant flow and augment the heat flux from starter/generator 26.

FIG. 3 is a simplified cross-sectional view of starter/generator 26 taken along line A—A of FIG. 2.

FIG. 4 is a simplified phantom view of an alternative embodiment of uppermost thermosyphon 24 showing the addition of an internal balancing wick 44. Starter/generator rotors can be very sensitive to even small imbalances, especially at very high rotation rates and during startup. During operation, the liquid working fluid inside evaporator section 38 will assume a generally crescent shape along the radially outward side of the inside wall of evaporator section 38. When rotor 24 is not rotating, liquid working fluid will puddle inside evaporator section 38 along the gravitationally lower inside wall. During startup, especially during rapid startup, these puddles can cause severe imbalances that can damage the starter/generator or the jet engine to which it is attached. Crescent wick 44 absorbs the working fluid, so that it cannot puddle, and holds it in the same position it will assume during regular speed operation, thus keeping the rotor in balance at all rotational speeds from startup to speeds greater than normal operating speed.

The shape assumed by a working fluid during rotation will not always be a crescent, but may be other similar shapes depending on the particular geometry of the thermosyphons and the movement of the jet engine and aircraft itself.

The evaporator section of a thermosyphon containing a balancing wick may be made with a straight, rather than sloped, inside wall to make manufacturing easier.

The disclosed new thermosyphon and thermosyphon system successfully demonstrates the use of adding pitched external fins to the condenser section of off-axis mounted thermosyphons. It also successfully demonstrates the use of adding balancing wicks to the inside of a rotating thermosyphon or other heat pipe. Although the disclosed apparatus is specialized, its teachings will find application in other areas where augmentation of current heating or cooling apparatus and systems, without requiring the addition of complicated additional apparatus, will make possible the use of those apparatus and systems for new applications.

While the description of the present invention is of a thermosyphon, the invention includes any heat pipe or similar mechanism rotating off-axis and the claims are not limited to thermosyphons.

Similarly, the invention may be used to provide cooling for a wide variety of motors, pumps and other mechanisms, and is not limited to jet engine integral starter/generators.

It is understood that various modifications to the invention as described may be made, as might occur to one with skill in the field of the invention, within the scope of the claims. Therefore, all embodiments contemplated have not been shown in complete detail. Other embodiments may be developed without departing from the spirit of the invention or from the scope of the claims.

I claim:

1. A cooling system, comprising:

(a) a shroud for providing a flowpath for a coolant;
(b) a plurality of off-axis thermosyphons positioned inside the shroud, each thermosyphon having a condenser section extending into the coolant flowpath and each thermosyphon also having an evaporator section, an inside wall and a longitudinal axis;
(c) fins attached to each condenser section, wherein the fins are oriented so that they will draw coolant through the shroud; and
(d) a wick having a fixed shape partially covering the inside wall of each enclosure, wherein a cross-section of each wick is asymmetrical about the respective longitudinal axis of each thermosyphon and wherein each wick has generally the shape a liquid working fluid would assume while the plurality of thermosyphons were rotating.

2. The cooling system according to claim 1, wherein each wick partially covers the inside wall of each evaporator section.

3. The cooling system according to claim 1, wherein each wick cross-section has generally the shape of a crescent.

4. A thermosyphon, comprising:
(a) an enclosure, including an evaporation section and a condenser section, the enclosure having an inside wall and a longitudinal axis; and,
(b) a wick having a fixed shape partially covering the inside wall of the enclosure, wherein a cross-section of the wick is asymmetrical about the longitudinal axis and wherein each wick has generally the shape a liquid working fluid would assume while the thermosyphon was rotating off-axis.

5. The thermosyphon according to claim 4, wherein the wick partially covers the inside wall of the evaporator section.

6. The thermosyphon according to claim 4, wherein the wick cross-section has generally the shape of a crescent.

* * * * *